United States Patent
Kim et al.

(10) Patent No.: US 10,410,120 B1
(45) Date of Patent: Sep. 10, 2019

(54) LEARNING METHOD AND TESTING METHOD OF OBJECT DETECTOR TO BE USED FOR SURVEILLANCE BASED ON R-CNN CAPABLE OF CONVERTING MODES ACCORDING TO ASPECT RATIOS OR SCALES OF OBJECTS, AND LEARNING DEVICE AND TESTING DEVICE USING THE SAME

(71) Applicant: Stradvision, Inc., Pohang, Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Pohang-si (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Pohang-si (KR); Hongmo Je, Pohang-si (KR); Hojin Cho, Gyeongsangbuk-do (KR)

(73) Assignee: Stradvision, Inc., Pohang, Gyeongbuk (KR)

(*) Notice: Subject to any disclaimer, the term of this patent is extended or adjusted under 35 U.S.C. 154(b) by 0 days.

(21) Appl. No.: 16/258,079

(22) Filed: Jan. 25, 2019

(51) Int. Cl.
*G06N 3/08* (2006.01)
*G06F 17/18* (2006.01)
(Continued)

(52) U.S. Cl.
CPC ............ *G06N 3/084* (2013.01); *G06F 17/15* (2013.01); *G06F 17/18* (2013.01);
(Continued)

(58) Field of Classification Search
CPC ............ G06N 3/02; G06N 3/08; G06N 3/082; G06N 3/084; G06F 17/15; G06F 17/18;
(Continued)

(56) References Cited

U.S. PATENT DOCUMENTS

2017/0124415 A1* 5/2017 Choi .................. G06N 3/08
2017/0206431 A1* 7/2017 Sun .................. G06N 3/084
(Continued)

*Primary Examiner* — Shane D Woolwine
(74) *Attorney, Agent, or Firm* — Kaplan Breyer Schwarz, LLP

(57) ABSTRACT

A method for learning an object detector based on a region-based convolutional neural network (R-CNN) capable of converting modes according to aspect ratios or scales of objects is provided. The aspect ratio and the scale of the objects including traffic lights may be determined according to characteristics, such as distance from the object detector, shapes, and the like, of the object. The method includes steps of: a learning device instructing an RPN to generate ROI candidates; instructing pooling layers to output feature vector; and learn the FC layers and the convolutional layer through backpropagation. In this method, pooling processes may be performed depending on real ratios and real sizes of the objects by using distance information and object information obtained through a radar, a lidar or other sensors. Also, the method can be used for surveillance as humans at a specific location have similar sizes.

28 Claims, 6 Drawing Sheets

(51) Int. Cl.
*G06F 17/15* (2006.01)
*G06K 9/32* (2006.01)
*G06K 9/00* (2006.01)
*G06T 3/40* (2006.01)
*G06K 9/62* (2006.01)
*G06N 3/02* (2006.01)

(52) U.S. Cl.
CPC ....... *G06K 9/00664* (2013.01); *G06K 9/3233* (2013.01); *G06K 9/6267* (2013.01); *G06T 3/4046* (2013.01); *G06N 3/02* (2013.01); *G06N 3/08* (2013.01); *G06N 3/082* (2013.01); *G06T 2207/20081* (2013.01); *G06T 2207/20084* (2013.01)

(58) Field of Classification Search
CPC ............. G06K 9/3233; G06K 9/00664; G06K 9/6267; G06T 2207/20081; G06T 2207/20084; G06T 3/4046
USPC ............................... 706/15, 20; 382/156, 157
See application file for complete search history.

(56) References Cited

U.S. PATENT DOCUMENTS

| 2018/0096457 A1* | 4/2018 | Savvides | G06K 9/6267 |
| 2019/0045168 A1* | 2/2019 | Chaudhuri | H04N 13/111 |
| 2019/0188525 A1* | 6/2019 | Choi | G06K 9/628 |

* cited by examiner $w_a$ : ANCHOR BOX'S WIDTH
$h_a$ : ANCHOR BOX'S HEIGHT
$x_a, y_a$ : ANCHOR BOX'S CENTER

LEARNING METHOD AND TESTING METHOD OF OBJECT DETECTOR TO BE USED FOR SURVEILLANCE BASED ON R-CNN CAPABLE OF CONVERTING MODES ACCORDING TO ASPECT RATIOS OR SCALES OF OBJECTS, AND LEARNING DEVICE AND TESTING DEVICE USING THE SAME

FIELD OF THE DISCLOSURE

The present disclosure relates to a learning method, a learning device, a testing method and a testing device for use with an autonomous vehicle; and more particularly, to the learning method and the learning device for learning an object detector based on an R-CNN, and the testing method and the testing device using the same.

BACKGROUND OF THE DISCLOSURE

In machine learning, a convolutional neural network (CNN, or ConvNet) is a class of deep, feed-forward artificial neural network that has successfully been applied to analyzing visual imagery.

FIG. 1 is a drawing schematically illustrating a testing method of an object detector by using a conventional R-CNN.

First, a testing device as illustrated in FIG. 1 may acquire an RGB image 101 as an input to be fed into one or more convolutional layers 102, i.e., convolutional filters, included in a convolution block. As the RGB image passes through the convolutional layers, a size, e.g., width and height, of the RGB image becomes smaller in its width and its height while the number of channels is increased.

Next, the testing device may pass a feature map 103 through a learned RPN (Region Proposal Network), to thereby generate an ROI 105, and may instruct a pooling layer 106 to resize a pixel data included in regions corresponding to the ROI 105 on the feature map by applying one of a max pooling operation or an average pooling operation to the regions, to resize the pixel data and generate a feature vector by referring to the resized feature map.

Then, the testing device may input the feature vector into a learned FC (Fully Connected) layer 108 to determine types of objects on the inputted RGB image by classification operation, etc., and may generate a bounding box on the inputted RGB image by using the FC layer.

According to a method for detecting the object by using a conventional R-CNN, ROI proposals are acquired by using anchor boxes. Herein, the anchor boxes have a variety of scales and aspect ratios in order to find various objects which have various sizes and shapes.

However, it has a drawback in that when the pooling layer pools the feature map, the pooling operation is performed with only single scale and single aspect ratio without considering various sizes and shapes of the objects. Thus, it cannot detect the objects precisely.

SUMMARY OF THE DISCLOSURE

It is an object of the present disclosure to solve all the aforementioned problems.

It is another object of the present disclosure to provide an R-CNN-based object detector capable of accurately detecting an object regardless of its size and shape.

It is still another object of the present disclosure to provide the R-CNN-based object detector capable of accurately detecting an object without an increase in the amount of computation or a decrease in a computation speed compared to the conventional art.

In accordance with one aspect of the present disclosure, there is provided a method for learning an object detector based on a region-based convolutional neural network (R-CNN), including steps of: (a) a learning device instructing at least one convolutional layer to apply at least one convolution operation to at least one training image to thereby output at least one feature map and instructing a regional proposal network (RPN) to (i) generate region of interest (ROI) candidates corresponding to candidate areas where at least one object is estimated to be located in the training image by using a plurality of anchor boxes which are distinguished by at least part of a scale and an aspect ratio on the feature map and (ii) output specific ROI candidates, which are determined as having high probabilities of the object being located therein, as ROI proposals; (b) the learning device (i) inputting the ROI proposals to each of pooling layers corresponding to each of pooling sizes set to be corresponding to each of specific anchor boxes used for generating the ROI proposals (ii) instructing each of the pooling layers to pool areas, corresponding to the ROI proposals, on the feature map according to its corresponding pooling size, to thereby output its corresponding feature vector, and (iii) instructing each of fully connected (FC) layers corresponding to each of the pooling layers to output each of object class information and each of object regression information corresponding to each of the ROI proposals by using each of the feature vectors; and (c) the learning device instructing each of object loss layers corresponding to each of the FC layers to calculate each of object class losses and each of object regression losses by referring to each of the object class information, each of the object regression information and each of their corresponding object ground truths (GT), to thereby learn each of the FC layers and the convolutional layer through backpropagation by using each of the object class losses and each of the object regression losses.

As one example, the learning device instructs an RPN loss layer to calculate each of ROI class losses and each of ROI regression losses by referring to (i) ROI class information and ROI regression information of the ROI candidates and (ii) each of their corresponding ROI GTs and wherein the learning device learns the RPN by performing backpropagation by using each of the ROI class losses and each of the ROI regression losses.

As one example, the learning device separately performs (i) backpropagation by using each of the object class losses and each of the object regression losses and (ii) backpropagation by using each of the ROI class losses and each of the ROI regression losses, respectively.

As one example, before the step of (a), the learning device has completed processes of learning the RPN through backpropagation by using each of ROI class losses and each of ROI regression losses which are calculated by referring to (i) ROI class information and ROI regression information of the ROI candidates and (ii) each of their corresponding ROI GTs.

As one example, each of the pooling sizes corresponds to the aspect ratio of the specific anchor boxes.

As one example, each of the pooling sizes corresponds to the scale of the specific anchor boxes.

As one example, each of the pooling sizes corresponds to a shape of the object to be detected.

As one example, each of the pooling sizes corresponds to each of sizes of the specific anchor boxes.

In accordance with another aspect of the present disclosure, there is provided a method for testing an object detector based on a region-based convolutional neural network (R-CNN), including steps of: (a) on condition that a learning device has performed processes of (I) instructing at least one convolutional layer to apply at least one convolution operation to at least one training image to thereby output at least one feature map for training and instructing a regional proposal network (RPN) to (i) generate region of interest (ROI) candidates for training corresponding to candidate areas where at least one object for training is estimated to be located in the training image by using a plurality of anchor boxes for training which are distinguished by at least part of a scale and an aspect ratio on the feature map for training and (ii) output specific ROI candidates for training, which are determined as having high probabilities of the object for training being located therein, as ROI proposals for training; (II) (i) inputting the ROI proposals for training to each of the pooling layers corresponding to each of pooling sizes set to be corresponding to each of specific anchor boxes for training used for generating the ROI proposals for training (ii) instructing each of the pooling layers to pool areas, corresponding to the ROI proposals for training, on the feature map for training according to its corresponding pooling size, to thereby output its corresponding feature vector for training, and (iii) instructing each of fully connected (FC) layers corresponding to each of the pooling layers to output each of object class information for training and each of object regression information for training corresponding to each of the ROI proposals for training by using each of the feature vectors for training; and (III) instructing each of object loss layers corresponding to each of the FC layers to calculate each of object class losses and each of object regression losses by referring to each of the object class information for training, each of the object regression information for training and each of their corresponding object ground truths (GT), to thereby learn each of the FC layers and the convolutional layer through backpropagation by using each of the object class losses and each of the object regression losses, a testing device instructing the convolutional layer to apply at least one convolution operation to at least one test image to thereby output at least one feature map for testing and instructing the RPN to (i) generate ROI candidates for testing corresponding to candidate areas where at least one object for testing is estimated to be located in the test image by using the anchor boxes for testing which are distinguished by at least part of a scale and an aspect ratio on the feature map for testing and (ii) output specific ROI candidates for testing, which are determined as having high probabilities of the object for testing being located therein, as ROI proposals for testing; and (b) the testing device (i) inputting the ROI proposals for testing to each of the pooling layers corresponding to each of pooling sizes set to be corresponding to each of specific anchor boxes for testing used for generating the ROI proposals for testing (ii) instructing each of the pooling layers to pool areas, corresponding to the ROI proposals for testing, on the feature map for testing according to its corresponding pooling size, to thereby output its corresponding feature vector for testing, and (iii) instructing each of the FC layers corresponding to each of the pooling layers to output each of object class information for testing and each of object regression information for testing corresponding to each of the ROI proposals for testing by using each of the feature vectors for testing.

As one example, before the process of (I), the learning device has completed processes of learning the RPN through backpropagation by using each of ROI class losses and each of ROI regression losses which are calculated by referring to (i) ROI class information for training and ROI regression information for training of the ROI candidates for training and (ii) each of their corresponding ROI GTs.

As one example, each of the pooling sizes corresponds to the aspect ratio of the specific anchor boxes for testing.

As one example, each of the pooling sizes corresponds to the scale of the specific anchor boxes for testing.

As one example, each of the pooling sizes corresponds to a shape of the object for testing to be detected.

As one example, each of the pooling sizes corresponds to each of sizes of the specific anchor boxes for testing.

In accordance with still another aspect of the present disclosure, there is provided a learning device for learning an object detector based on a region-based convolutional neural network (R-CNN), including: at least one memory that stores instructions; and at least one processor configured to execute the instructions to: perform processes of (I) instructing at least one convolutional layer to apply at least one convolution operation to at least one training image to thereby output at least one feature map and instructing a regional proposal network (RPN) to (i) generate region of interest (ROI) candidates corresponding to candidate areas where at least one object is estimated to be located in the training image by using a plurality of anchor boxes which are distinguished by at least part of a scale and an aspect ratio on the feature map and (ii) output specific ROI candidates, which are determined as having high probabilities of the object being located therein, as ROI proposals, (II) (i) inputting the ROI proposals to each of pooling layers corresponding to each of pooling sizes set to be corresponding to each of specific anchor boxes used for generating the ROI proposals (ii) instructing each of the pooling layers to pool areas, corresponding to the ROI proposals, on the feature map according to its corresponding pooling size, to thereby output its corresponding feature vector, and (iii) instructing each of fully connected (FC) layers corresponding to each of the pooling layers to output each of object class information and each of object regression information corresponding to each of the ROI proposals by using each of the feature vectors, and (III) instructing each of object loss layers corresponding to each of the FC layers to calculate each of object class losses and each of object regression losses by referring to each of the object class information, each of the object regression information and each of their corresponding object ground truths (GT), to thereby learn each of the FC layers and the convolutional layer through backpropagation by using each of the object class losses and each of the object regression losses.

As one example, the processor instructs an RPN loss layer to calculate each of ROI class losses and each of ROI regression losses by referring to (i) ROI class information and ROI regression information of the ROI candidates and (ii) each of their corresponding ROI GTs and wherein the learning device learns the RPN by performing backpropagation by using each of the ROI class losses and each of the ROI regression losses.

As one example, the processor separately performs (i) backpropagation by using each of the object class losses and each of the object regression losses and (ii) backpropagation by using each of the ROI class losses and each of the ROI regression losses, respectively.

As one example, before the process of (I), the processor has completed processes of learning the RPN through backpropagation by using each of ROI class losses and each of ROI regression losses which are calculated by referring to (i) ROI class information and ROI regression information of the ROI candidates and (ii) each of their corresponding ROI GTs.

As one example, each of the pooling sizes corresponds to the aspect ratio of the specific anchor boxes.

As one example, each of the pooling sizes corresponds to the scale of the specific anchor boxes.

As one example, each of the pooling sizes corresponds to a shape of the object to be detected.

As one example, each of the pooling sizes corresponds to each of sizes of the specific anchor boxes.

In accordance with still yet another aspect of the present disclosure, there is provided a testing device for testing an object detector based on a region-based convolutional neural network (R-CNN), including: at least one memory that stores instructions; and at least one processor, on condition that a learning device has performed processes of (I) instructing at least one convolutional layer to apply at least one convolution operation to at least one training image to thereby output at least one feature map for training and instructing a regional proposal network (RPN) to (i) generate region of interest (ROI) candidates for training corresponding to candidate areas where at least one object for training is estimated to be located in the training image by using a plurality of anchor boxes for training which are distinguished by at least part of a scale and an aspect ratio on the feature map for training and (ii) output specific ROI candidates for training, which are determined as having high probabilities of the object for training being located therein, as ROI proposals for training; (II) (i) inputting the ROI proposals for training to each of the pooling layers corresponding to each of pooling sizes set to be corresponding to each of specific anchor boxes for training used for generating the ROI proposals for training (ii) instructing each of the pooling layers to pool areas, corresponding to the ROI proposals for training, on the feature map for training according to its corresponding pooling size, to thereby output its corresponding feature vector for training, and (iii) instructing each of fully connected (FC) layers corresponding to each of the pooling layers to output each of object class information for training and each of object regression information for training corresponding to each of the ROI proposals for training by using each of the feature vectors for training; and (III) instructing each of object loss layers corresponding to each of the FC layers to calculate each of object class losses and each of object regression losses by referring to each of the object class information for training, each of the object regression information for training and each of their corresponding object ground truths (GT), to thereby learn each of the FC layers and the convolutional layer through backpropagation by using each of the object class losses and each of the object regression losses; configured to execute the instructions to: perform processes of (1) instructing the convolutional layer to apply at least one convolution operation to at least one test image to thereby output at least one feature map for testing and instructing the RPN to (i) generate ROI candidates for testing corresponding to candidate areas where at least one object for testing is estimated to be located in the test image by using the anchor boxes for testing which are distinguished by at least part of a scale and an aspect ratio on the feature map for testing and (ii) output specific ROI candidates for testing, which are determined as having high probabilities of the object for testing being located therein, as ROI proposals for testing, and (2) (i) inputting the ROI proposals for testing to each of the pooling layers corresponding to each of pooling sizes set to be corresponding to each of specific anchor boxes for testing used for generating the ROI proposals for testing (ii) instructing each of the pooling layers to pool areas, corresponding to the ROI proposals for testing, on the feature map for testing according to its corresponding pooling size, to thereby output its corresponding feature vector for testing, and (iii) instructing each of the FC layers corresponding to each of the pooling layers to output each of object class information for testing and each of object regression information for testing corresponding to each of the ROI proposals for testing by using each of the feature vectors for testing.

As one example, before the process of (I), the learning device has completed processes of learning the RPN through backpropagation by using each of ROI class losses and each of ROI regression losses which are calculated by referring to (i) ROI class information for training and ROI regression information for training of the ROI candidates for training and (ii) each of their corresponding ROI GTs.

As one example, each of the pooling sizes corresponds to the aspect ratio of the specific anchor boxes for testing.

As one example, each of the pooling sizes corresponds to the scale of the specific anchor boxes for testing.

As one example, each of the pooling sizes corresponds to a shape of the object for testing to be detected.

As one example, each of the pooling sizes corresponds to each of sizes of the specific anchor boxes for testing.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
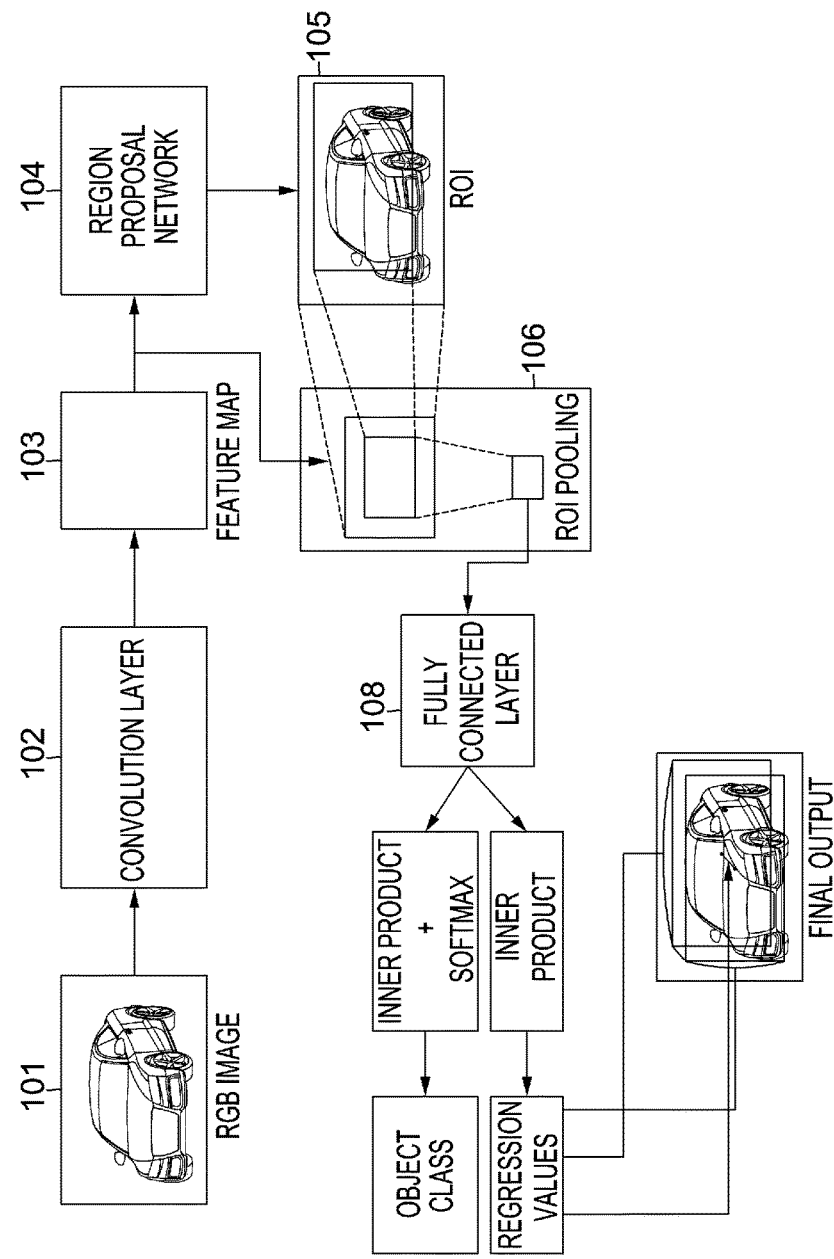
FIG. 1 is a drawing schematically illustrating a testing device of an object detector based on a region-based convolutional neural network (R-CNN) in accordance with a conventional art.

Detailed explanation on the present disclosure to be made below refer to attached drawings and diagrams illustrated as specific embodiment examples under which the present disclosure may be implemented to make clear of purposes, technical solutions, and advantages of the present disclosure.

These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

Figure 2:
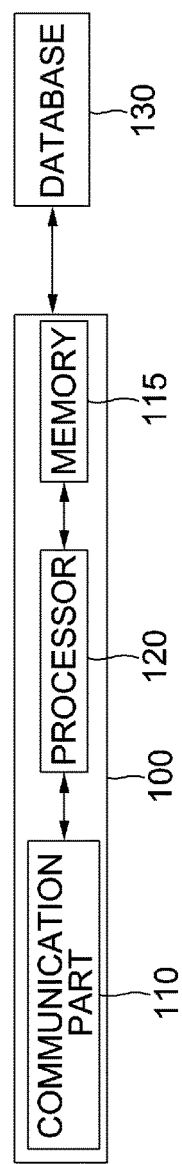
FIG. 2 is a drawing schematically illustrating a learning device for learning an object detector based on the R-CNN in accordance with an example embodiment of the present disclosure.

FIG. 2 is a drawing schematically illustrating a learning device 100 for learning an object detector based on an R-CNN in accordance with an example embodiment of the present disclosure. Referring to FIG. 2, the learning device 100 may include a communication part 110 and a processor 120.

In addition, the learning device may further include a memory 115 capable of storing computer readable instructions for performing following processes. As one example, the processor, the memory, a medium, etc. may be integrated with an integrated processor.

First of all, the communication part 110 may receive at least one training image.

Herein, the training image may be stored in a database 130, and the database 130 may store at least one ground truth (GT) for class information and location information with regard to respective objects included in training images.

The processor 120 instructs at least one convolutional layer to apply at least one convolution operation to the training image to thereby output at least one feature map and instructs a regional proposal network (RPN) to (i) generate ROI candidates corresponding to candidate areas where at least one object is estimated to be located in the training image by using a plurality of anchor boxes which are distinguished by at least part of a scale and an aspect ratio on the feature map and (ii) output specific ROI candidates, which are determined as having high probabilities of the object being located therein, as ROI proposals. Herein, the above-mentioned "high probabilities" may mean that each of the probabilities is equal to or greater than a predetermined threshold. Further, the processor 120 (*i*) inputs the ROI proposals to each of the pooling layers corresponding to each of pooling sizes set to be corresponding to each of specific anchor boxes used for generating the ROI proposals (ii) instructs each of the pooling layers to pool areas, corresponding to the ROI proposals, on the feature map according to its corresponding pooling size, to thereby output its corresponding feature vector, and (iii) instructs each of fully connected (FC) layers corresponding to each of the pooling layers to output each of object class information and each of object regression information corresponding to each of the ROI proposals by using each of the feature vectors. Thereafter, the processor 120 instructs each of object loss layers corresponding to each of the FC layers to calculate each of object class losses and each of object regression losses by referring to each of the object class information, each of the object regression information and each of their corresponding object ground truths (GT), to thereby learn each of the FC layers and the convolutional layer through backpropagation by using each of the object class losses and each of the object regression losses.

In addition, the learning device 100 instructs an RPN loss layer to calculate each of ROI class losses and each of ROI regression losses by referring to (i) ROI class information and ROI regression information of the ROI candidates and (ii) each of their corresponding ROI GTs. Thereafter, the learning device learns the RPN by performing backpropagation by using each of the ROI class losses and each of the ROI regression losses.

Herein, the learning device 100 may separately perform (i) backpropagation by using each of the object class losses and each of the object regression losses and (ii) backpropagation by using each of the ROI class losses and each of the ROI regression losses.

The learning device 100 in accordance with an example embodiment of the present disclosure is a computing device, and any device including a processor having a computation capability may be adopted as the learning device 100. Further, FIG. 2 illustrates only one learning device 100, but the present disclosure is not limited to this example. The learning device may be configured as several devices to perform its function.

Likewise, the method for learning the object detector based on the R-CNN by using the learning device 100 in accordance with an example embodiment of the present disclosure will be described by referring to FIG. 3.

First of all, if the training image is inputted, the learning device 100 instructs at least one convolutional layer 121 to apply at least one convolution operation to the training image to thereby output at least one feature map. Herein, the convolutional layer 121 may include a plurality of convolutional units capable of sequentially applying the convolution operations to the training image.

In addition, the learning device 100 instructs a regional proposal network (RPN) 122 to (i) generate ROI candidates corresponding to candidate areas where at least one object is estimated to be located in the training image by using a plurality of anchor boxes which are distinguished by at least part of a scale and an aspect ratio on the feature map and (ii) output specific ROI candidates, which are determined as having high probabilities of the object being located therein, as ROI proposals.

Figure 4:
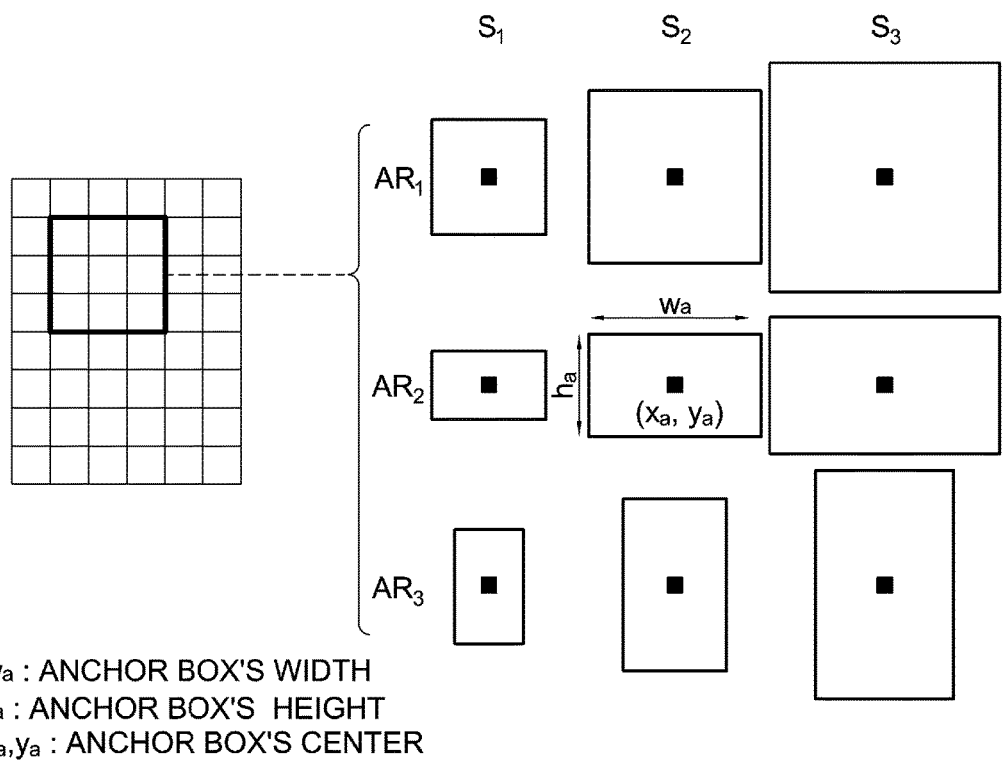
FIG. 4 is a drawing schematically illustrating anchor boxes in a regional proposal network (RPN) in the object detector based on the R-CNN in accordance with an example embodiment of the present disclosure.

For example, referring to FIG. 4, 9 anchor boxes may be provided according to the scale S1, S2 or S3 and the aspect ratio AR1, AR2 or AR3, but the present disclosure is not limited to these examples, and various numbers of the anchor boxes may be provided by changing the scale and the aspect ratio. Further, the learning device 100 moves a sliding window, having a predetermined size, on the feature map and applies at least one convolution operation to each of areas on the feature map corresponding to each of positions of the moving sliding window, to thereby generate a feature map with a predetermined size. Then, the generated feature map is inputted to an ROI classification layer and an ROI regression layer. Herein, the feature map shown in FIG. 4 includes respective features. Then, the learning device 100 instructs the ROI classification layer to output ROI class information for each of the anchor boxes determined by referring to each of centers of the moving sliding window and instructs the ROI regression layer to output ROI regression information for each of the anchor boxes determined by referring to each of centers of the moving sliding window. Thereafter, the learning device 100 selects each of specific anchor boxes, which has an intersection over union (IOU) equal to or greater than a predetermined first value and has each of highest IOUs in each of areas in the moving sliding window, as ROI candidates, by referring to the ROI class information and the ROI regression information. Herein, the IOU may be calculated by using a positive GT. Meanwhile, the learning device 100 may regard other anchor boxes, which have an IOU equal to or less than a predetermined second value, as non-positive anchors.

Thereafter, the learning device 100 checks each of pooling layers 123-1, 123-2, . . . , 123-*n* corresponding to each of pooling sizes set to be corresponding to each of the specific anchor boxes used for generating the ROI proposals.

Herein, each of the pooling sizes may correspond to the aspect ratio of the specific anchor boxes or the scale of the specific anchor boxes. Further, each of the pooling sizes may correspond to a shape of the object to be detected. In addition, each of the pooling sizes may correspond to each of sizes of the specific anchor boxes. Herein, each of the sizes of the specific anchor boxes may be determined by the combination of the aspect ratio and the scale.

For example, referring to FIG. 4, when each of the pooling sizes is set to correspond to the aspect ratio of the specific anchor boxes, the pooling sizes may be set to (i) the size (the aspect ratio: AR1, the scale: S1) of anchor box, the size (the aspect ratio: AR2, the scale: S1) of anchor box and the size (the aspect ratio: AR3, the scale: S1) of anchor box, (ii) the size (the aspect ratio: AR1, the scale: S2) of anchor box, the size (the aspect ratio: AR2, the scale: S2) of anchor box and the size (the aspect ratio: AR3, the scale: S2) of anchor box, or (iii) the size (the aspect ratio: AR1, the scale: S3) of anchor box, the size (the aspect ratio: AR2, the scale: S3) of anchor box and the size (the aspect ratio: AR3, the scale: S3) of anchor box. If each of the pooling sizes is set to (i) the size (the aspect ratio: AR1, the scale: S1) of anchor box, the size (the aspect ratio: AR2, the scale: S1) of anchor box and the size (the aspect ratio: AR3, the scale: S1) of anchor box, each of anchor boxes of other scales S2 or S3 may be set to correspond to each of pooling sizes corresponding to the aspect ratio thereof regardless of the scale thereof. Namely, each of the pooling sizes of anchor box (AR1, S2) and anchor box (AR1, S3) may be set to the pooling size of anchor box (AR1, S1), and each of the pooling sizes of anchor box (AR2, S2) and anchor box (AR2, S3) may be set to the pooling size of anchor box (AR2, S1), and each of the pooling sizes of anchor box (AR3, S2) and anchor box (AR3, S3) may be set to the pooling size of anchor box (AR3, S1).

In addition, if each of the pooling sizes is set to correspond to the scale of the specific anchor boxes, the pooling sizes may be set to (i) the sizes of anchor boxes (AR1, S1), (AR1, S2) and (AR1, S3), (ii) the sizes of anchor boxes (AR2, S1), (AR2, S2) and (AR2, S3), or (iii) the sizes of anchor boxes (AR3, S1), (AR3, S2) and (AR3, S3).

Further, if each of the pooling sizes is set to correspond to both the aspect ratio and the scale of the specific anchor boxes, the pooling sizes may be set to the sizes of anchor boxes (AR1, S1), (AR2, S2) and (AR3, S3).

In addition, each of the pooling sizes may be set to correspond to each of the sizes of the anchor boxes. Namely, for example, if the aspect ratios are 1, 1/2 and 2, respectively and the scales are 1, 2 and 3, respectively, then the sizes of the respective anchor boxes may be 1×1, 2×1, 1×2, 2×2, 4×2, 2×4, 3×3, 6×3 and 3×6, and each of the pooling sizes may be set to be the same as that of each of the anchor boxes.

However, the setting of the pooling sizes corresponding to the anchor boxes is merely illustrative, and the present disclosure is not limited to the example. The pooling sizes may be set by various combinations of various factors.

Further, the learning device 100 inputs the ROI proposals to each of the pooling layers 123-1, 123-2, . . . , 123-*n* corresponding to each of the pooling sizes, and instructs each of the pooling layers 123-1, 123-2, . . . , 123-*n* to pool areas, corresponding to the ROI proposals, on the feature map according to its corresponding pooling size, to thereby output its corresponding feature vector.

Thereafter, the learning device 100 instructs each of fully connected (FC) layers 124-1, 124-2, . . . , 124-*n* corresponding to each of the pooling layers 123-1, 123-2, . . . , 123-*n* to output each of object class information 125-1, 125-2, . . . , 125-*n* and each of object regression information 126-1, 126-2, . . . , 126-*n* corresponding to each of the ROI proposals by using each of the feature vectors.

Thereafter, the learning device 100 instructs each of object loss layers 127-1, 127-2, . . . , 127-*n* corresponding to each of the FC layers 124-1, 124-2, . . . , 124-*n* to calculate each of object class losses and each of object regression losses by referring to each of the object class information 125-1, 125-2, . . . , 125-*n*, each of the object regression information 126-1, 126-2, . . . , 126-*n* and each of their corresponding object ground truths (GT), to thereby learn each of the FC layers 124-1, 124-2, . . . , 124-*n* and the convolutional layer 121 through backpropagation by using each of the object class losses and each of the object regression losses.

For example, the learning device 100 learns the first FC layer 124-1 and the convolutional layer 121 through backpropagation by using a first object class loss and a first object regression loss corresponding to the first object loss layer 127-1, and learns the second FC layer 124-2 and the convolutional layer 121 through backpropagation by using a second object class loss and a second object regression loss corresponding to the second object loss layer 127-2. In the same manner, the learning device 100 learns the n-th FC layer 124-n and the convolutional layer 121 through backpropagation by using an n-th object class loss and an n-th object regression loss corresponding to the n-th loss layer 127-n.

Further, the learning device 100 may instruct an RPN loss layer 128 corresponding to the RPN 122 to calculate each of ROI class losses and each of ROI regression losses by referring to (i) ROI class information and ROI regression information of the ROI candidates and (ii) each of their corresponding ROI GTs and the learning device 100 may learn the RPN 122 by performing backpropagation by using each of the ROI class losses and each of the ROI regression losses. Herein, the learning device separately performs (i) backpropagation by using each of the object class losses and each of the object regression losses and (ii) backpropagation by using each of the ROI class losses and each of the ROI regression losses. Further, the learning device 100 may have completed in advance processes of learning the RPN 122 through backpropagation by using each of ROI class losses and each of ROI regression losses.

Figure 5:
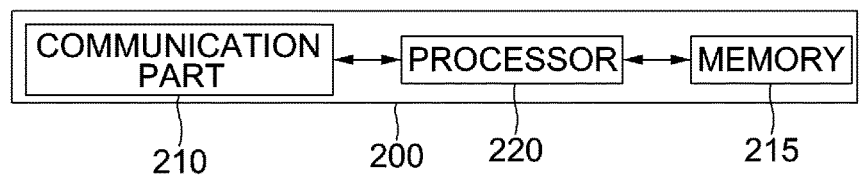
FIG. 5 is a drawing schematically illustrating a testing device for testing an object detector based on the R-CNN in accordance with an example embodiment of the present disclosure.

FIG. 5 is a drawing schematically illustrating a testing device 200 for testing an object detector based on the R-CNN in accordance with an example embodiment of the present disclosure. Referring to FIG. 5, the testing device 200 may include a communication part 210 and a processor 220.

In addition, the testing device may further include a memory 215 capable of storing computer readable instructions for performing following processes. As one example, the processor, the memory, a medium, etc. may be integrated with an integrated processor.

First of all, the communication part may receive at least one test image.

Herein, the object detector based on the the R-CNN in accordance with an example embodiment of the present disclosure may have been learned in advance by using the learning method as described above by referring to FIGS. 2 to 4.

Figure 3:
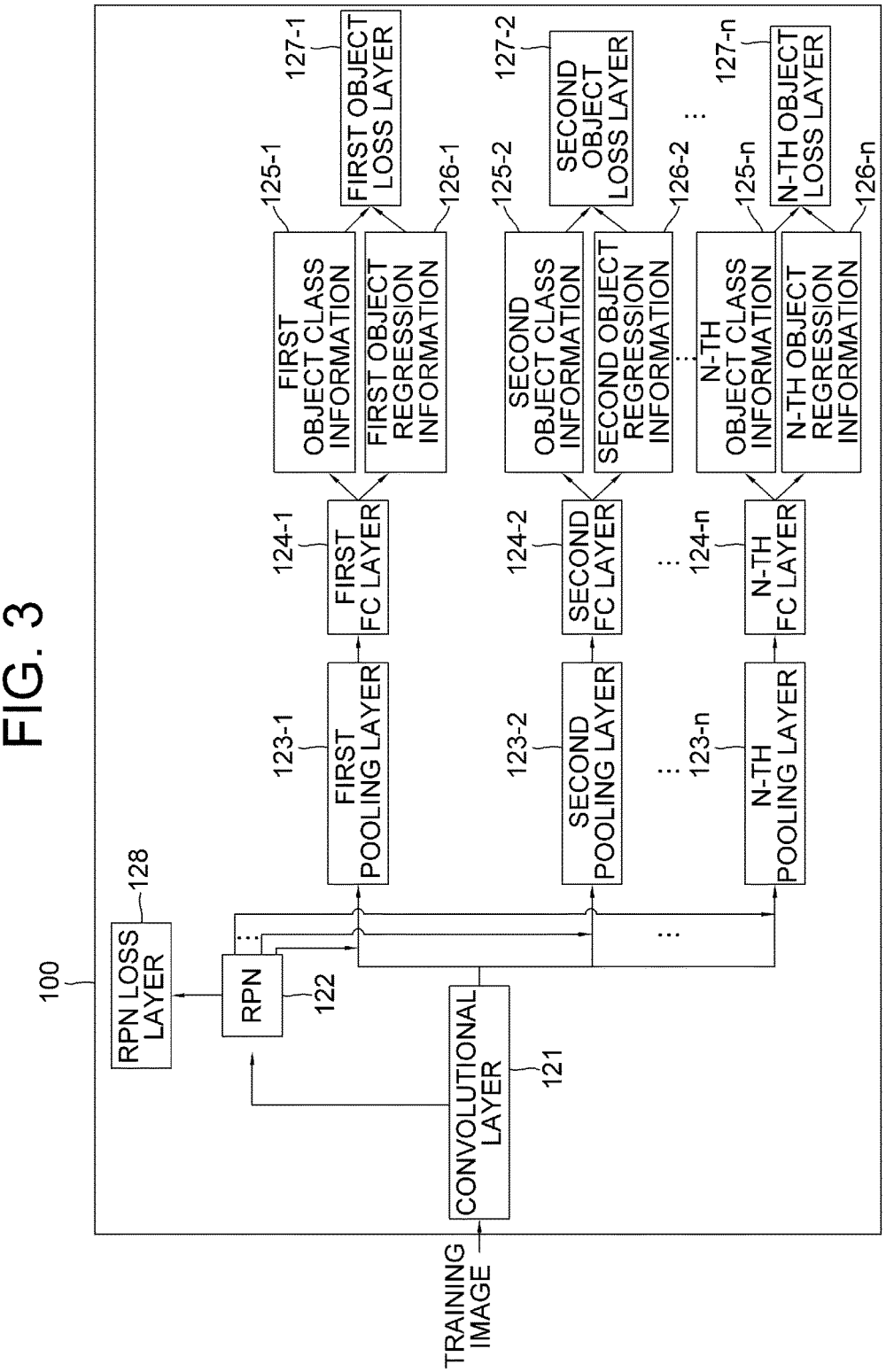
FIG. 3 is a drawing schematically illustrating a method for learning the object detector based on the R-CNN in accordance with an example embodiment of the present disclosure.

For reference, reference numbers 221, 222, 223, 224, 225 and 226 of the testing device in FIG. 5 represent same parts as indicated by the reference numbers 121, 122, 123, 124, 125 and 126 of the learning device in FIG. 3. Also, the phrase "for training" is added for terms related to the learning processes, and the phrase "for testing" is added for terms related to testing processes, to avoid possible confusion.

Namely, it may be a condition that (I) a learning device has instructed at least one convolutional layer 221 to apply at least one convolution operation to the training image to thereby output at least one feature map for training and has instructed a regional proposal network (RPN) 222 to (i) generate region of interest (ROI) candidates for training corresponding to candidate areas where at least one object for training is estimated to be located in the training image by using a plurality of anchor boxes for training which are distinguished by at least part of a scale and an aspect ratio on the feature map for training and (ii) output specific ROI candidates for training, which are determined as having high probabilities of the object for training being located therein, as ROI proposals for training; (II) the learning device 100 (i) has inputted the ROI proposals for training to each of the pooling layers 223-1, 223-2, . . . , 223-n corresponding to each of pooling sizes set to be corresponding to each of specific anchor boxes for training used for generating the ROI proposals for training (ii) has instructed each of the pooling layers 223-1, 223-2, . . . , 223-n to pool areas, corresponding to the ROI proposals for training, on the feature map for training according to its corresponding pooling size, to thereby output its corresponding feature vector for training, and (iii) has instructed each of fully connected (FC) layers 224-1, 224-2, . . . , 224-n corresponding to each of the pooling layers 223-1, 223-2, . . . , 223-n to output each of object class information 225-1, 225-2, . . . , 225-n for training and each of object regression information 226-1, 226-2, . . . , 226-n for training corresponding to each of the ROI proposals for training by using each of the feature vectors for training; and (III) the learning device has instructed each of object loss layers 127-1, 127-2, . . . , 127-n corresponding to each of the FC layers 224-1, 224-2, . . . , 224-n to calculate each of object class losses and each of object regression losses by referring to each of the object class information 225-1, 225-2, . . . , 225-n for training, each of the object regression information 226-1, 226-2, . . . , 226-n for training and each of their corresponding object ground truths (GT), to thereby learn each of the FC layers 224-1, 224-2, . . . , 224-n and the convolutional layer 221 through backpropagation by using each of the object class losses and each of the object regression losses.

The processor 220 may perform (I) a first process of instructing the convolutional layer 221 to apply at least one convolution operation to at least one test image to thereby output at least one feature map for testing and instructing the RPN 222 to (i) generate ROI candidates for testing corresponding to candidate areas where at least one object for testing is estimated to be located in the test image by using the anchor boxes for testing which are distinguished by at least part of a scale and an aspect ratio on the feature map for testing and (ii) output specific ROI candidates for testing, which are determined as having high probabilities of the object for testing being located therein, as ROI proposals for testing and (II) a second process of (i) inputting the ROI proposals for testing to each of the pooling layers 223-1, 223-2, . . . , 223-n corresponding to each of pooling sizes set to be corresponding to each of specific anchor boxes for testing used for generating the ROI proposals for testing (ii) instructing each of the pooling layers 223-1, 223-2, . . . , 223-n to pool areas, corresponding to the ROI proposals for testing, on the feature map for testing according to its corresponding pooling size, to thereby output its corresponding feature vector for testing, and (iii) instructing each of the FC layers 224-1, 224-2, . . . , 224-n corresponding to each of the pooling layers 223-1, 223-2, . . . , 223-n to output each of object class information 225-1, 225-2, . . . , 225-n for testing and each of object regression information 226-1, 226-2, . . . , 226-n for testing corresponding to each of the ROI proposals for testing by using each of the feature vectors for testing.

Herein, the testing device 200 in accordance with an example embodiment of the present disclosure is a computing device, and any device including a processor having a computation capability may be adopted as the testing device 200. Further, FIG. 5 illustrates only one testing device 200, but the present disclosure is not limited to this example. The testing device may be configured as several devices to perform its function.

Figure 6:
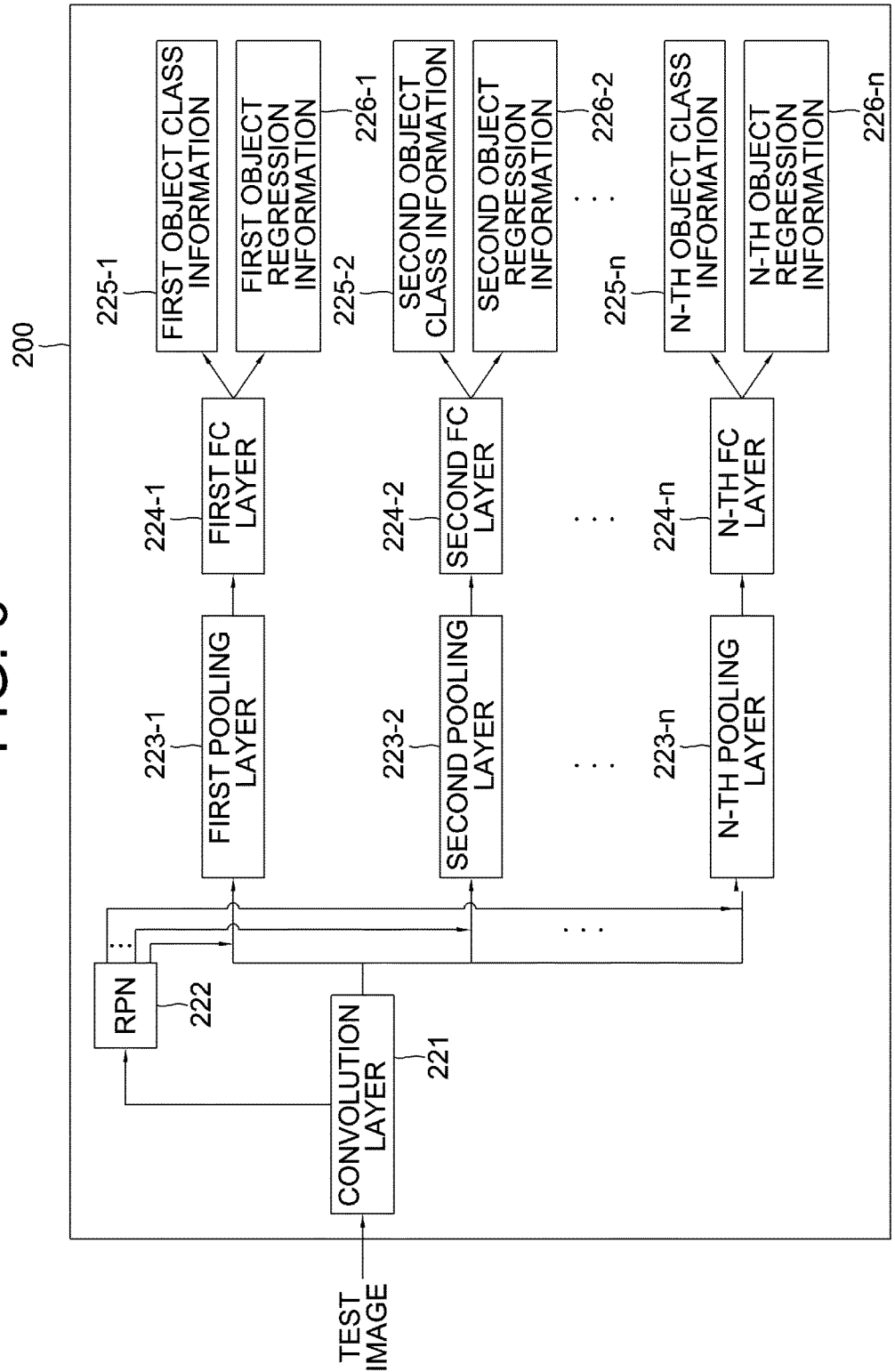
FIG. 6 is a drawing schematically illustrating a method for testing an object detector based on the R-CNN in accordance with an example embodiment of the present disclosure.

The method for testing the object detector based on the R-CNN by using the testing device 200 in accordance with an example embodiment of the present disclosure will be described by referring to FIG. 6. In the description below, explanation on the testing method easily understandable from the learning method will be omitted.

First of all, on condition that the convolutional layer 221, the RPN 222, and each of the FC layers 224-1, 224-2, ..., 224-*n* have been learned by the learning method described by referring to FIGS. 2 to 4, if at least one test image is received, the testing device 200 instructs the convolutional layer 221 to apply at least one convolution operation to the test image to thereby output at least one feature map for testing. Herein, the convolutional layer 221 may be composed of a plurality of convolutional units in order to sequentially apply the convolution operations to the test image.

Further, the testing device 200 instruct the RPN 222 to (i) generate ROI candidates for testing corresponding to candidate areas where at least one object for testing is estimated to be located in the test image by using the anchor boxes for testing which are distinguished by at least part of a scale and an aspect ratio on the feature map for testing and (ii) output specific ROI candidates for testing, which are determined as having high probabilities of the object for testing being located therein, as ROI proposals for testing.

Thereafter, the testing device 200 checks each of pooling layers 223-1, 223-2, ..., 223-*n* corresponding to each of pooling sizes set to be corresponding to each of specific anchor boxes for testing used for generating the ROI proposals for testing.

Herein, each of the pooling sizes may correspond to the aspect ratio of the specific anchor boxes or may correspond to the scale of the specific anchor boxes. In addition, each of the pooling sizes may correspond to a shape of the object to be detected or may correspond to each of sizes of the specific anchor boxes.

Further, the testing device 200 inputs the ROI proposals for testing to each of the pooling layers 223-1, 223-2, ..., 223-*n* corresponding to each of the pooling sizes, and instructs each of the pooling layers 223-1, 223-2, ..., 223-*n* in order to pool areas, corresponding to the ROI proposals for testing, on the feature map for testing according to its corresponding pooling size, to thereby output its corresponding feature vector for testing.

Thereafter, the testing device 200 instructs each of the FC layers 224-1, 224-2, ..., 224-*n* corresponding to each of the pooling layers 223-1, 223-2, ..., 223-*n* to output each of object class information 225-1, 225-2, ..., 225-*n* for testing and each of object regression information 226-1, 226-2, ..., 226-*n* for testing corresponding to each of the ROI proposals for testing by using each of the feature vectors for testing, to thereby detect the object for testing in the test image.

The present disclosure has an effect of more accurately detecting the object, compared to the conventional art, by pooling the areas on the feature map according to information on the anchor boxes used for the ROI proposals in the object detector based on the R-CNN.

The present disclosure has another effect of more accurately detecting the object regardless of its size and shape, compared to the conventional art, by pooling the areas on the feature map according to information on the anchor boxes used for the ROI proposals in the object detector based on the R-CNN.

The present disclosure has still another effect of more accurately detecting the object without an increase in the amount of computation or a decrease in a computation speed, compared to the conventional art, by using the same number of ROI proposals as that of the conventional art, in the object detector based on the R-CNN.

The R-CNN may be capable of converting modes according to aspect ratios or scales of objects. The aspect ratio and the scale of the objects including traffic lights may be determined according to characteristics, such as distance from the object detector, shapes, and the like, of the object. In accordance with the present invention, the pooling processes may be performed depending on real ratios and real sizes of the objects by using distance information and object information obtained through a radar, a lidar or other sensors. Also, the learning method and the testing method can be used for surveillance, as humans at a specific location have similar sizes from a same viewpoint.

It would be understood by one of ordinary skill in the art that a transmission and/or a reception of the above-described images such as the training image and the test image can be performed by communication units of the learning device and the testing device, and processes of the convolution operation, the deconvolution operation and the loss value operation can be mainly performed by processors of the learning device and the testing device, but the present disclosure is not limited to these examples.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning an object detector based on a region-based convolutional neural network (R-CNN), comprising steps of:

(a) a learning device instructing at least one convolutional layer to apply at least one convolution operation to at least one training image to thereby output at least one feature map and instructing a regional proposal network (RPN) to (i) generate region of interest (ROI) candidates corresponding to candidate areas where at least one object is estimated to be located in the training image by using a plurality of anchor boxes which are distinguished by at least part of a scale and an aspect ratio on the feature map and (ii) output specific ROI candidates, which are determined as having high probabilities of the object being located therein, as ROI proposals;

(b) the learning device (i) inputting the ROI proposals to each of pooling layers corresponding to each of pooling sizes set to be corresponding to each of specific anchor boxes used for generating the ROI proposals (ii) instructing each of the pooling layers to pool areas, corresponding to the ROI proposals, on the feature map according to its corresponding pooling size, to thereby output its corresponding feature vector, and (iii) instructing each of fully connected (FC) layers corresponding to each of the pooling layers to output each of object class information and each of object regression information corresponding to each of the ROI proposals by using each of the feature vectors; and (c) the learning device instructing each of object loss layers corresponding to each of the FC layers to calculate each of object class losses and each of object regression losses by referring to each of the object class information, each of the object regression information and each of their corresponding object ground truths (GT), to thereby learn each of the FC layers and the convolutional layer through backpropagation by using each of the object class losses and each of the object regression losses.

2. The method of claim 1, wherein the learning device instructs an RPN loss layer to calculate each of ROI class losses and each of ROI regression losses by referring to (i) ROI class information and ROI regression information of the ROI candidates and (ii) each of their corresponding ROI GTs and wherein the learning device learns the RPN by performing backpropagation by using each of the ROI class losses and each of the ROI regression losses.

3. The method of claim 2, wherein the learning device separately performs (i) backpropagation by using each of the object class losses and each of the object regression losses and (ii) backpropagation by using each of the ROI class losses and each of the ROI regression losses, respectively.

4. The method of claim 1, wherein, before the step of (a), the learning device has completed processes of learning the RPN through backpropagation by using each of ROI class losses and each of ROI regression losses which are calculated by referring to (i) ROI class information and ROI regression information of the ROI candidates and (ii) each of their corresponding ROI GTs.

5. The method of claim 1, wherein each of the pooling sizes corresponds to the aspect ratio of the specific anchor boxes.

6. The method of claim 1, wherein each of the pooling sizes corresponds to the scale of the specific anchor boxes.

7. The method of claim 1, wherein each of the pooling sizes corresponds to a shape of the object to be detected.

8. The method of claim 1, wherein each of the pooling sizes corresponds to each of sizes of the specific anchor boxes.

9. A method for testing an object detector based on a region-based convolutional neural network (R-CNN), comprising steps of:

(a) on condition that a learning device has performed processes of (I) instructing at least one convolutional layer to apply at least one convolution operation to at least one training image to thereby output at least one feature map for training and instructing a regional proposal network (RPN) to (i) generate region of interest (ROI) candidates for training corresponding to candidate areas where at least one object for training is estimated to be located in the training image by using a plurality of anchor boxes for training which are distinguished by at least part of a scale and an aspect ratio on the feature map for training and (ii) output specific ROI candidates for training, which are determined as having high probabilities of the object for training being located therein, as ROI proposals for training; (II) (i) inputting the ROI proposals for training to each of the pooling layers corresponding to each of pooling sizes set to be corresponding to each of specific anchor boxes for training used for generating the ROI proposals for training (ii) instructing each of the pooling layers to pool areas, corresponding to the ROI proposals for training, on the feature map for training according to its corresponding pooling size, to thereby output its corresponding feature vector for training, and (iii) instructing each of fully connected (FC) layers corresponding to each of the pooling layers to output each of object class information for training and each of object regression information for training corresponding to each of the ROI proposals for training by using each of the feature vectors for training; and (III) instructing each of object loss layers corresponding to each of the FC layers to calculate each of object class losses and each of object regression losses by referring to each of the object class information for training, each of the object regression information for training and each of their corresponding object ground truths (GT), to thereby learn each of the FC layers and the convolutional layer through backpropagation by using each of the object class losses and each of the object regression losses, a testing device instructing the convolutional layer to apply at least one convolution operation to at least one test image to thereby output at least one feature map for testing and instructing the RPN to (i) generate ROI candidates for testing corresponding to candidate areas where at least one object for testing is estimated to be located in the test image by using the anchor boxes for testing which are distinguished by at least part of a scale and an aspect ratio on the feature map for testing and (ii) output specific ROI candidates for testing, which are determined as having high probabilities of the object for testing being located therein, as ROI proposals for testing; and (b) the testing device (i) inputting the ROI proposals for testing to each of the pooling layers corresponding to each of pooling sizes set to be corresponding to each of specific anchor boxes for testing used for generating the ROI proposals for testing (ii) instructing each of the pooling layers to pool areas, corresponding to the ROI proposals for testing, on the feature map for testing according to its corresponding pooling size, to thereby output its corresponding feature vector for testing, and (iii) instructing each of the FC layers corresponding to each of the pooling layers to output each of object class information for testing and each of object regression information for testing corresponding to each of the ROI proposals for testing by using each of the feature vectors for testing.

10. The method of claim 9, wherein, before the process of (I), the learning device has completed processes of learning the RPN through backpropagation by using each of ROI class losses and each of ROI regression losses which are calculated by referring to (i) ROI class information for training and ROI regression information for training of the ROI candidates for training and (ii) each of their corresponding ROI GTs.

11. The method of claim 9, wherein each of the pooling sizes corresponds to the aspect ratio of the specific anchor boxes for testing.

12. The method of claim 9, wherein each of the pooling sizes corresponds to the scale of the specific anchor boxes for testing.

13. The method of claim 9, wherein each of the pooling sizes corresponds to a shape of the object for testing to be detected.

14. The method of claim 9, wherein each of the pooling sizes corresponds to each of sizes of the specific anchor boxes for testing.

15. A learning device for learning an object detector based on a region-based convolutional neural network (R-CNN), comprising:
  at least one memory that stores instructions; and
  at least one processor configured to execute the instructions to: perform processes of (I) instructing at least one convolutional layer to apply at least one convolution operation to at least one training image to thereby output at least one feature map and instructing a regional proposal network (RPN) to (i) generate region of interest (ROI) candidates corresponding to candidate areas where at least one object is estimated to be located in the training image by using a plurality of anchor boxes which are distinguished by at least part of a scale and an aspect ratio on the feature map and (ii) output specific ROI candidates, which are determined as having high probabilities of the object being located therein, as ROI proposals, (II) (i) inputting the ROI proposals to each of pooling layers corresponding to each of pooling sizes set to be corresponding to each of specific anchor boxes used for generating the ROI proposals (ii) instructing each of the pooling layers to pool areas, corresponding to the ROI proposals, on the feature map according to its corresponding pooling size, to thereby output its corresponding feature vector, and (iii) instructing each of fully connected (FC) layers corresponding to each of the pooling layers to output each of object class information and each of object regression information corresponding to each of the ROI proposals by using each of the feature vectors, and (III) instructing each of object loss layers corresponding to each of the FC layers to calculate each of object class losses and each of object regression losses by referring to each of the object class information, each of the object regression information and each of their corresponding object ground truths (GT), to thereby learn each of the FC layers and the convolutional layer through backpropagation by using each of the object class losses and each of the object regression losses.

16. The learning device of claim 15, wherein the processor instructs an RPN loss layer to calculate each of ROI class losses and each of ROI regression losses by referring to (i) ROI class information and ROI regression information of the ROI candidates and (ii) each of their corresponding ROI GTs and wherein the learning device learns the RPN by performing backpropagation by using each of the ROI class losses and each of the ROI regression losses.

17. The learning device of claim 16, wherein the processor separately performs (i) backpropagation by using each of the object class losses and each of the object regression losses and (ii) backpropagation by using each of the ROI class losses and each of the ROI regression losses, respectively.

18. The learning device of claim 15, wherein, before the process of (I), the processor has completed processes of learning the RPN through backpropagation by using each of ROI class losses and each of ROI regression losses which are calculated by referring to (i) ROI class information and ROI regression information of the ROI candidates and (ii) each of their corresponding ROI GTs.

19. The learning device of claim 15, wherein each of the pooling sizes corresponds to the aspect ratio of the specific anchor boxes.

20. The learning device of claim 15, wherein each of the pooling sizes corresponds to the scale of the specific anchor boxes.

21. The learning device of claim 15, wherein each of the pooling sizes corresponds to a shape of the object to be detected.

22. The learning device of claim 15, wherein each of the pooling sizes corresponds to each of sizes of the specific anchor boxes.

23. A testing device for testing an object detector based on a region-based convolutional neural network (R-CNN), comprising:
  at least one memory that stores instructions; and
  at least one processor, on condition that a learning device has performed processes of (I) instructing at least one convolutional layer to apply at least one convolution operation to at least one training image to thereby output at least one feature map for training and instructing a regional proposal network (RPN) to (i) generate region of interest (ROI) candidates for training corresponding to candidate areas where at least one object for training is estimated to be located in the training image by using a plurality of anchor boxes for training which are distinguished by at least part of a scale and an aspect ratio on the feature map for training and (ii) output specific ROI candidates for training, which are determined as having high probabilities of the object for training being located therein, as ROI proposals for training; (II) (i) inputting the ROI proposals for training to each of the pooling layers corresponding to each of pooling sizes set to be corresponding to each of specific anchor boxes for training used for generating the ROI proposals for training (ii) instructing each of the pooling layers to pool areas, corresponding to the ROI proposals for training, on the feature map for training according to its corresponding pooling size, to thereby output its corresponding feature vector for training, and (iii) instructing each of fully connected (FC) layers corresponding to each of the pooling layers to output each of object class information for training and each of object regression information for training corresponding to each of the ROI proposals for training by using each of the feature vectors for training; and (III) instructing each of object loss layers corresponding to each of the FC layers to calculate each of object class losses and each of object regression losses by referring to each of the object class information for training, each of the object regression information for training and each of their corresponding object ground truths (GT), to thereby learn each of the FC layers and the convolutional layer through backpropagation by using each of the object class losses and each of the object regression losses; configured to execute the instructions to: perform processes of (1) instructing the convolutional layer to apply at least one convolution operation to at least one test image to thereby output at least one feature map for testing and instructing the RPN to (i) generate ROI candidates for testing corresponding to candidate areas where at least one object for testing is estimated to be located in the test image by using the anchor boxes for testing which are distinguished by at least part of a scale and an aspect ratio on the feature map for testing and (ii) output specific ROI candidates for testing, which are determined as having high probabilities of the object for testing being located therein, as ROI proposals for testing, and (2) (i) inputting the ROI proposals for testing to each of the pooling layers corresponding to each of pooling sizes set to be corresponding to each of specific anchor boxes for testing used for generating the ROI proposals for testing (ii) instructing each of the pooling layers to pool areas, corresponding to the ROI proposals for testing, on the feature map for testing according to its corresponding pooling size, to thereby output its corresponding feature vector for testing, and (iii) instructing each of the FC layers corresponding to each of the pooling layers to output each of object class information for testing and each of object regression information for testing corresponding to each of the ROI proposals for testing by using each of the feature vectors for testing.

24. The testing device of claim 23, wherein, before the process of (I), the learning device has completed processes of learning the RPN through backpropagation by using each of ROI class losses and each of ROI regression losses which are calculated by referring to (i) ROI class information for training and ROI regression information for training of the ROI candidates for training and (ii) each of their corresponding ROI GTs.

25. The testing device of claim 23, wherein each of the pooling sizes corresponds to the aspect ratio of the specific anchor boxes for testing.

26. The testing device of claim 23, wherein each of the pooling sizes corresponds to the scale of the specific anchor boxes for testing.

27. The testing device of claim 23, wherein each of the pooling sizes corresponds to a shape of the object for testing to be detected.

28. The testing device of claim 23, wherein each of the pooling sizes corresponds to each of sizes of the specific anchor boxes for testing.

* * * * *